(12) United States Patent
Sun et al.

(10) Patent No.: US 7,584,296 B2
(45) Date of Patent: Sep. 1, 2009

(54) ASYNCHRONOUS NETWORK STACK OPERATION IN AN OPERATING SYSTEM INDEPENDENT ENVIRONMENT

(75) Inventors: Yuanhao Sun, Shanghai (CN); Caidong Song, Shanghai (CN); Rui Jian, Shanghai (CN); Ying'an Deng, Shanghai (CN); Zhi Wang, Shanghai (CN)

(73) Assignee: Intel Corporation, Santa Clara, CA (US)

(*) Notice: Subject to any disclaimer, the term of this patent is extended or adjusted under 35 U.S.C. 154(b) by 641 days.

(21) Appl. No.: 10/574,292

(22) PCT Filed: Mar. 5, 2005

(86) PCT No.: PCT/CN2005/000265

§ 371 (c)(1),
(2), (4) Date: Mar. 31, 2006

(87) PCT Pub. No.: WO2006/094428

PCT Pub. Date: Sep. 14, 2006

(65) Prior Publication Data

US 2008/0313322 A1    Dec. 18, 2008

(51) Int. Cl.
*G06F 15/16* (2006.01)
(52) U.S. Cl. .................................. 709/237; 709/230
(58) Field of Classification Search ............. 709/227, 709/228, 230, 237, 231; 370/328
See application file for complete search history.

(56) References Cited

U.S. PATENT DOCUMENTS

| 2001/0055283 A1* | 12/2001 | Beach | 370/328 |
| 2002/0095511 A1* | 7/2002 | Walker | 709/231 |
| 2002/0161907 A1* | 10/2002 | Moon | 709/230 |
| 2004/0210657 A1* | 10/2004 | Narayanan et al. | 709/227 |
| 2006/0059265 A1* | 3/2006 | Keronen | 709/228 |

* cited by examiner

*Primary Examiner*—Le Luu
(74) *Attorney, Agent, or Firm*—Blakely, Sokoloff, Taylor & Zafman LLP

(57) ABSTRACT

Techniques for operation of an asynchronous stack in a pre-boot environment. A token-based stack design may be used to support communications between network stack layers.

20 Claims, 5 Drawing Sheets

ASYNCHRONOUS NETWORK STACK OPERATION IN AN OPERATING SYSTEM INDEPENDENT ENVIRONMENT

CROSS-REFERENCE TO RELATED APPLICATION

This application is a National Phase application of, and claims priority to, International Application No. PCT/CN2005/000265, filed Mar. 5, 2005, entitled: "ASYNCHRONOUS NETWORK STACK OPERATION IN AN OPERATING SYSTEM INDEPENDENT ENVIRONMENT"

TECHNICAL FIELD

Embodiments of the invention relate to network stack operation More particularly, embodiments of the invention relate to uses of an asynchronous network stack that may be used in an operating system independent (e.g., pre-boot) environment.

BACKGROUND

The pre-boot environment of an electronic device may be used for remote boot and/or remote installation purposes, which may require the electronic device to download one or more files from a remote server before control of the electronic device is passed to an operating system. In the pre-boot execution environment (PXE), the electronic device may receive one or more files form one or more remote servers. However, as the number of files downloaded increases and/or the functionality of the PXE increases, the current synchronous interface for packet transmission and receipt may become a bottleneck to system performance. Thus, current techniques for uploading and downloading of data in the PXE do not provide optimal performance.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are techniques for asynchronous network stack operation in an operating system independent environment. In one embodiment, the asynchronous operation may be supported by a token-based stack design that may be used for network communications in the pre-boot environment, or any operating system independent environment. The techniques provide an asynchronous calling framework for network stack drivers that represent various operational layers. In one embodiment, the driver actions (e.g., transmit receive) are schedulable.

Described herein are techniques for use of a token to support operation of the asynchronous network stack. In one embodiment, the token may have the following four characteristics: 1) the token may identify a requested action (e.g., to transmit a data packet, to receive a data packet), 2) a status indicator to indicate the current phase of the token or the result of the request, 3) an event to provide notification of a status change, and 4) a context. In alternate embodiments, additional and/or different token characteristics may be supported.

Figure 1:
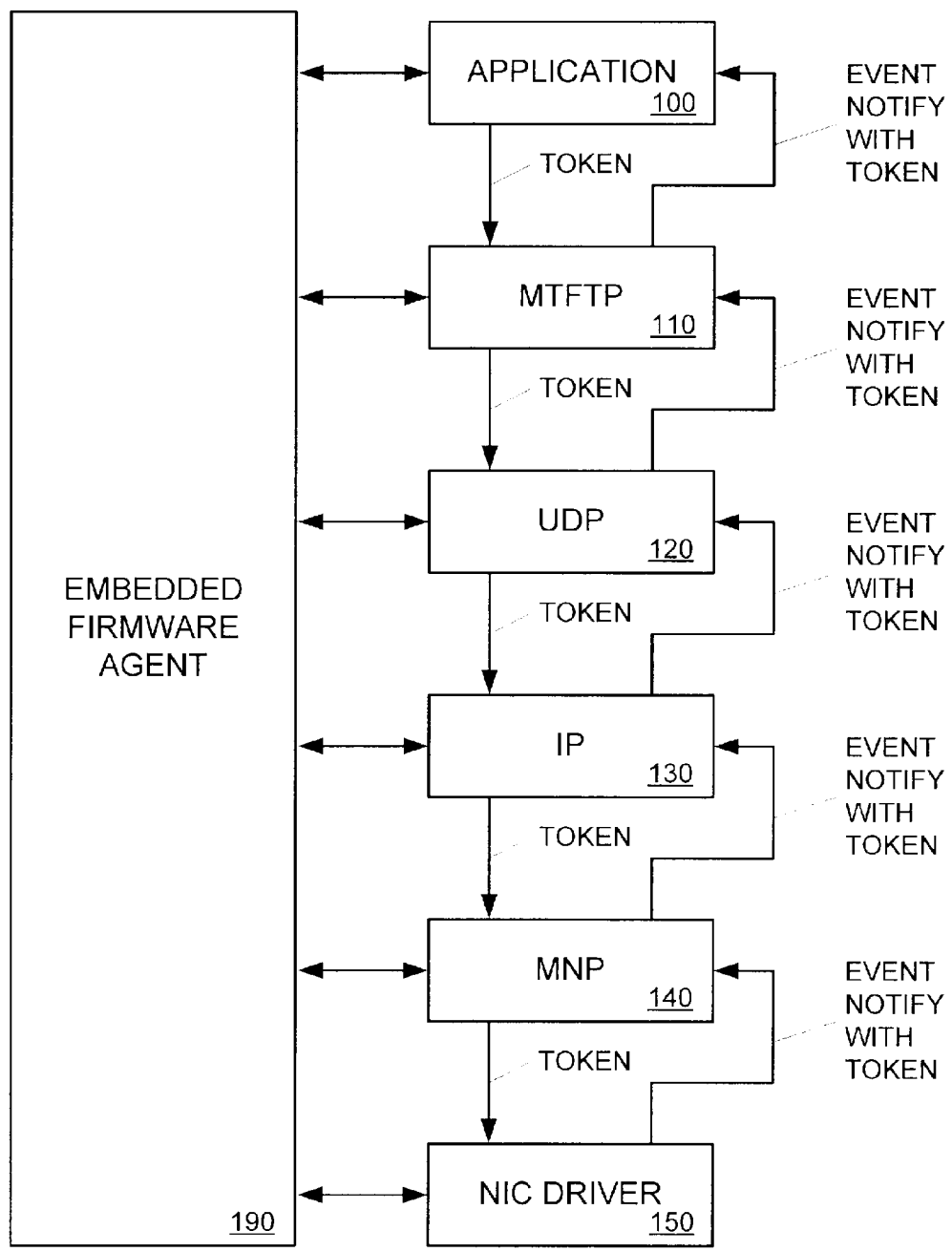
FIG. 1 is a conceptual block diagram of one embodiment of an asynchronous network stack that operates using a token.

FIG. 1 is a conceptual block diagram of one embodiment of an asynchronous network stack that operates using a token. The conceptual block diagram of FIG. 1 includes specific network layers and protocols; however, in alternate embodiments different protocols and/or layers may be supported.

In one embodiment, the physical implementation of each network layer may be configured to communicate with embedded firmware agent 190. In alternate embodiments, one or more of the layers may not be configured to communicate with embedded firmware agent 190. Application 100 may represent any type of application, whether under operating system control or not, that includes functionality to communicate over a network external to the host device. Application 190 may be any type of application known in the art.

In one embodiment, Application 190 may request services, for example, transmission of a network packet, by passing a token to Multicast Trivial File Transfer Protocol layer 110. In general, TFTP is a transfer protocol that is simpler to use than the File Transfer Protocol (FTP), but provides less functionality. For example, TFTP does not support user authentication or directory visibility. TFTP uses the User Datagram Protocol (UDP) rather than the Transmission Control Protocol (TCP). One embodiment of TFTP is described formally in Request for Comments (RFC) 1350, Rev. 2, published July 1992.

TFTP has been expanded to include a multicast option as described in RFC 2090, published February 1997. Multicast TFTP classifies client devices as active clients or passive clients. There is only one active client at a time. The active client communicates with a server to download data using a stop-and-wait ARQ flow and error control technique to a negotiated group address. When the requested activity has been accomplished, MTFTP layer 110 returns an event notification with the token requesting the activity. Use of the token and the event notification may allow application 190 to continue operation and engage in other tasks during the time required to accomplish the requested activity.

In one embodiment, the token passing technique may be employed between each network stack layer. That is, between MTFTP layer 110 and UDP layer 120, between UDP layer 120 and IP layer 130, between IP layer 130 and Managed Network Protocol (MNP) layer 140, and between MNP layer 140 and NIC driver 150.

In one embodiment, MTFTP layer 110, UDP layer 120, IP layer 130 and MNP layer 140 may represent layered network drivers. In a synchronous network stack, the calling layer will halt operation while the called layer performs the requested operation. In contrast, using the asynchronous network stack techniques described herein, a layer may request an operation from a lower layer using a token and perform operations not dependent upon the requested operation while the operation is being performed by the lower layer.

For example, IP layer 130 may request a received IP packet and may prepare a receive token and an associated notify event. After passing the receive token to MNP layer 140, IP layer 130 may engage in other operations, for example, preparation of a packet for transmission. When a packet is received from the network and processed by MNP layer 240, the received packet may be stored and MNP layer 240 may notify IP layer 140 of the received packet via an event with token received from IP layer 140. In response to the event, IP layer 140 may process the received packet.

Figure 2:
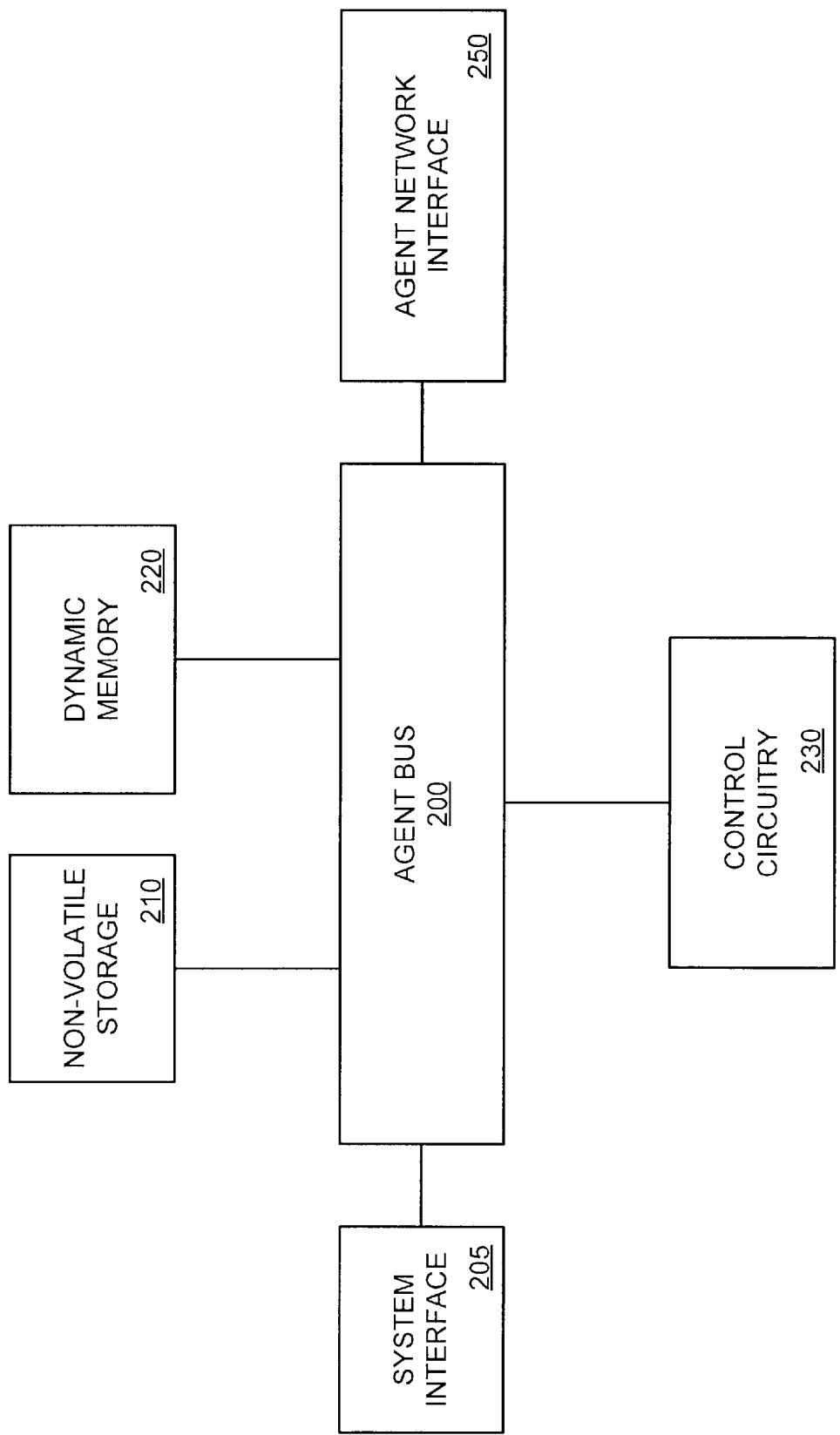
FIG. 2 is a block diagram of one embodiment of an embedded firmware agent.

In one embodiment, embedded firmware agent 190 may allow the asynchronous network stack to operate in an operating system independent environment FIG. 2 is a block diagram of one embodiment of an embedded firmware agent. In the example of FIG. 2 the embedded firmware agent may have an interface compliant with an Extensible Firmware Interface (EFI) as defined by the EFI Specifications, version 1.10, published Nov. 26, 2003, available from Intel Corporation of Santa Clara, Calif. In alternate embodiments, other firmware components can also be used.

In one embodiment the embedded firmware agent may include agent bus 200 coupled with system interface 205. System interface 205 may provide an interface through which the embedded firmware agent communicates with the host system. The embedded firmware agent may further include agent network interface 250 that may be coupled with an external network (not shown in FIG. 2) to allow the embedded firmware agent to communicate with a remote electronic device. Agent network interface 250 may support wired and/or wireless network communications.

In one embodiment the embedded firmware agent further includes dynamic memory 210 that may be coupled with agent bus 200. Dynamic memory 210 may provide storage for instructions and/or data to be used during operation. The embedded firmware agent may further include non-volatile storage 220 that may be coupled with agent bus 200 to store static data and/or instructions. In one embodiment, the embedded firmware agent may include control circuitry 230 coupled with agent bus 200 that may perform control operations and/or execute instructions provided by dynamic memory 210 and/or non-volatile storage 220.

In one embodiment, the embedded firmware agent may support operations that are independent of the host operating system. These operations may be, for example, pre-boot operations that are performed prior to the operating system being loaded, or while the operating system is being loaded, but prior to transfer of control to the operating system. These operations may also be independent of the host operating system when the host operating system has control of the host electronic device. For example, in one embodiment, the embedded firmware agent may be coupled with a host processor via an interrupt interlace with, for example, the SMI pin of a Pentium® processor or with the PMI pin of an Itanium® processor (generically, xMI line). Other system interrupt signals may be used for other processors.

Because use of tokens as described herein may allow layer operations to be schedulable, parallel technology including, for example, hyperthreading, multi-processor systems and multi-threading may be incorporated into the firmware level design and allow stack drivers to perform parallel operations. With use of, for example, an interrupt or a timer, an embedded firmware agent may interact with the asynchronous network stack to enable network operations including, for example, a background web server or a background telnet server, to be supported in a pre-boot or operating system independent environment. Use of status and/or context mat may be supported by the token may allow network stack layers to communicate status without use of other channels as may be required by synchronous stack configurations.

Figure 3:
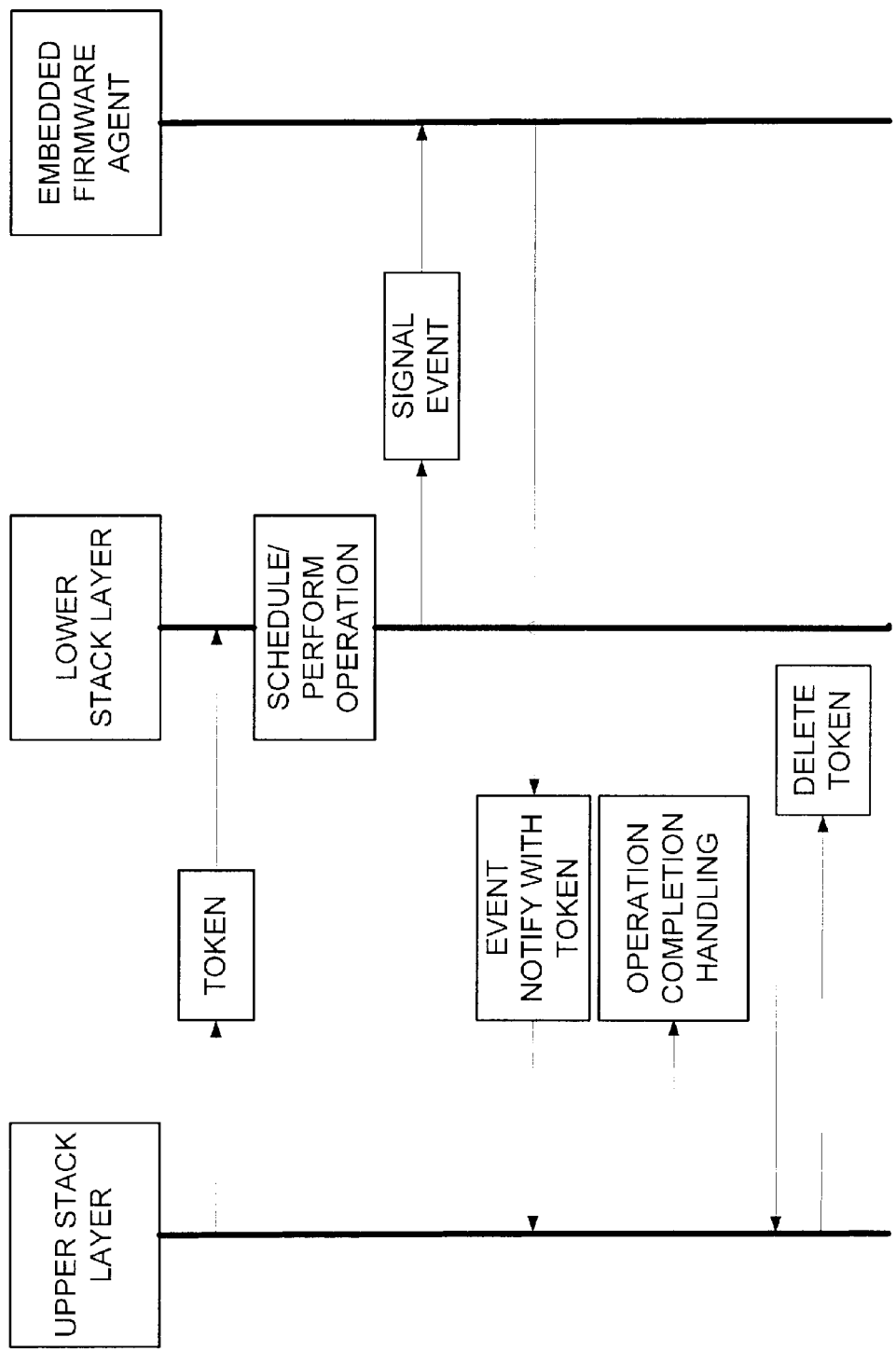
FIG. 3 is a conceptual flow diagram of one embodiment of a token passing sequence between layers in an asynchronous network stack.

FIG. 3 is a conceptual flow diagram of one embodiment of a token passing sequence between layers in an asynchronous network stack. In one embodiment, the upper network stack may generate or prepare a token to request a specific operation (e.g., transmission or receipt of a packet). In one embodiment, the token may include a notify event and/or contextual information that may be used to communicate status or context of the requested operation. In one embodiment, the upper stack layer may call a method or function of the lower stack layer to pass the token to the lower stack layer.

In response to receiving the token, the lower stack layer may perform and/or schedule the operation requested (e.g., transmit, receive) with the token. Upon completion of the requested operation, the lower stack layer may generate or prepare a signal event that communicates the completion of the requested operation to the embedded firmware agent. In one embodiment the embedded firmware agent may notify the upper stack layer of completion of the requested operation with an event notification. In response to receiving the event notification, the upper stack layer may perform any operation completion handling and delete the token.

Figure 4:
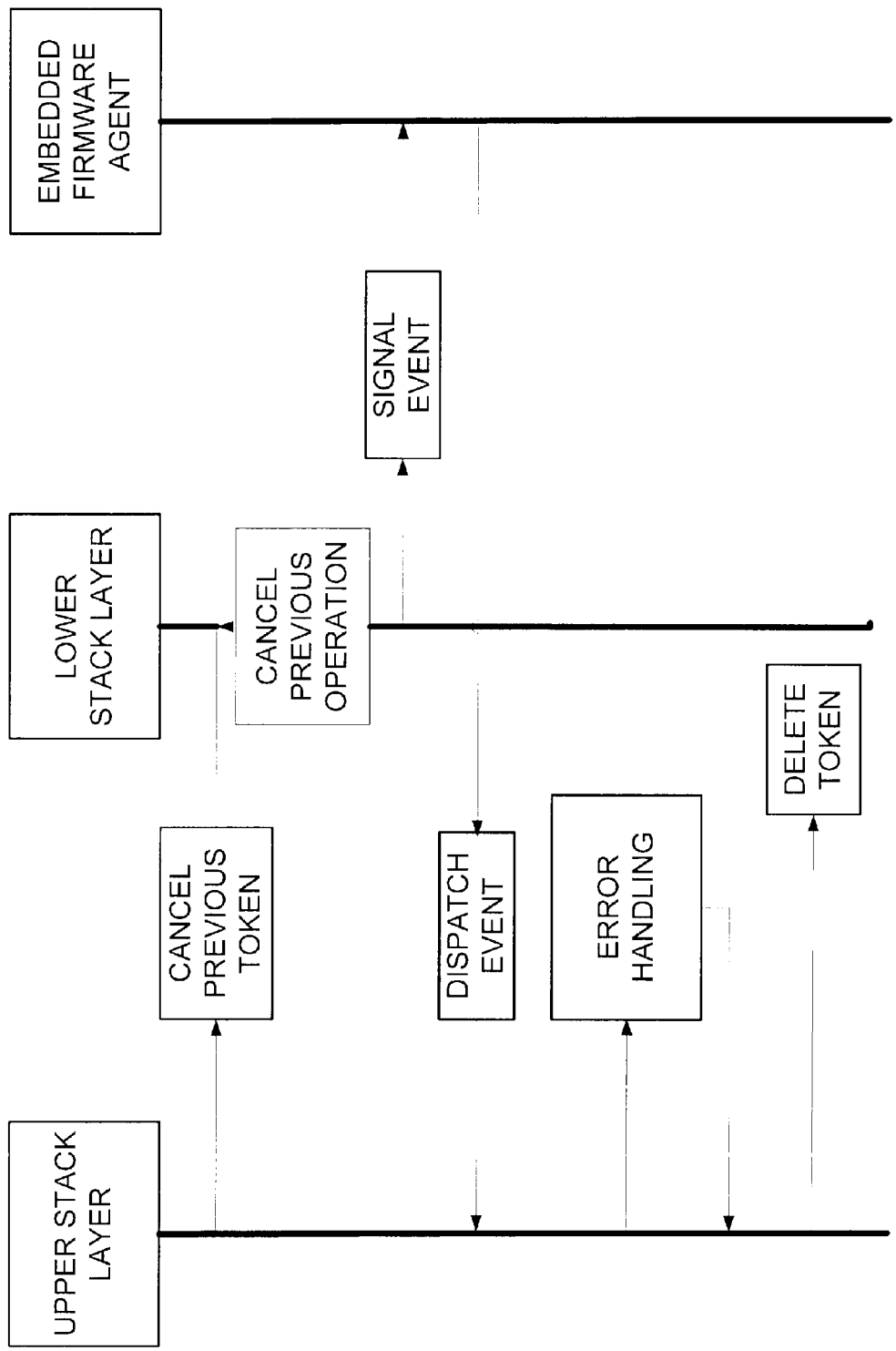
FIG. 4 is a conceptual flow diagram of one embodiment of a sequence between layers in an asynchronous network stack to cancel a previously requested/scheduled operation using a token.

FIG. 4 is a conceptual flow diagram of one embodiment of a sequence between layers in an asynchronous network stack to cancel a previously requested/scheduled operation using a token. In one embodiment, the upper network stack may generate or prepare a cancel request to cancel a previously generated token. In one embodiment, the cancel request may include the token and/or contextual information that may be used to communicate status or context of the token.

In one embodiment, the upper stack layer may call a method or function of the lower stack layer to pass the cancel request to the lower stack layer. In response to receiving the cancel request, the lower stack layer may abort the previous operation identified by the token and then generate or prepare a signal event to embedded firmware agent. In one embodiment the embedded firmware agent may transmit a dispatch event signal to the upper stack layer, which may cause the upper stack layer to perform any error handling and delete the token.

Figure 5:
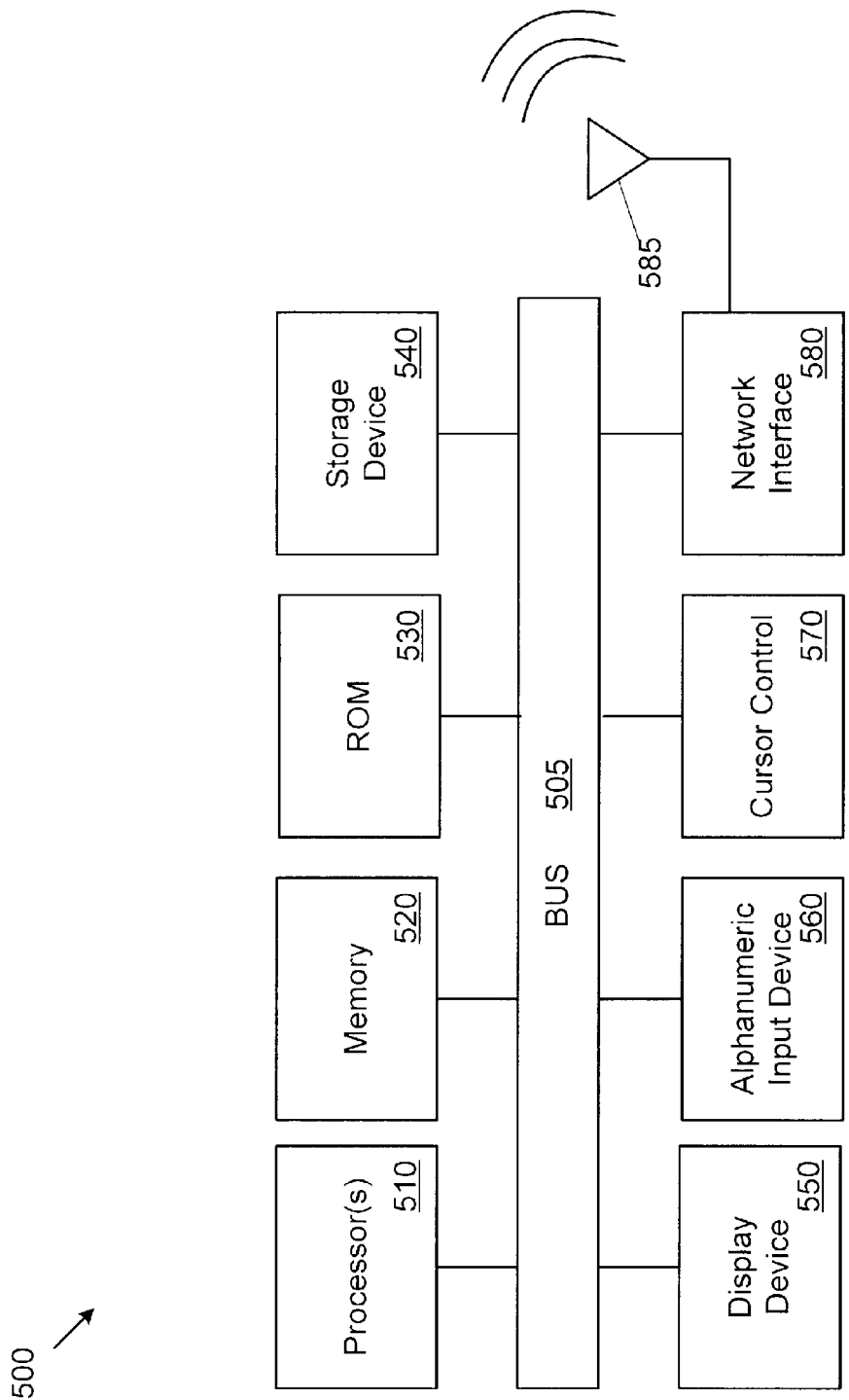
FIG. 5 is a block diagram of one embodiment of an electronic system.

In one embodiment, the techniques of FIGS. 3 and 4 can be implemented as instructions executed by an electronic system. The instructions may be stored by the electronic device or the instructions can be received by the electronic device (e.g., via a network connection). FIG. 5 is a block diagram of one embodiment of an electronic system. The electronic system illustrated in FIG. 5 is intended to represent a range of electronic systems, for example, computer systems, network access devices, etc. Alternative systems, whether electronic or non-electronic, can include more, fewer and/or different components. The electronic system of FIG. 5 may represent a server device as well as the one or more client devices.

Electronic system 500 includes bus 505 or other communication device to communicate information, and processor 510 coupled to bus 505 to process information. While electronic system 500 is illustrated with a single processor, electronic system 500 can include multiple processors and/or co-processors. Electronic system 500 further includes random access memory (RAM) or other dynamic storage device 520 (referred to as memory), coupled to bus 505 to store information and instructions to be executed by processor 510.

Memory 520 also can be used to store temporary variables or other intermediate information during execution of instructions by processor 510.

Electronic system 500 also includes read only memory (ROM) and/or other static storage device 530 coupled to bus 505 to store static information and instructions for processor 510. In one embodiment, static storage device 530 may include an embedded firmware agent. In alternate embodiments, other firmware components can also be used.

Data storage device 540 is coupled to bus 505 to store information and instructions. Data storage device 540 such as a magnetic disk or optical disc and corresponding drive can be coupled to electronic system 500.

Electronic system 500 can also be coupled via bus 505 to display device 550, such as a cathode ray tube (CRT) or liquid crystal display (LCD), to display information to a user. Alphanumeric input device 560, including alphanumeric and other keys, is typically coupled to bus 505 to communicate information and command selections to processor 510. Another type of user input device is cursor control 570, such as a mouse, a trackball, or cursor direction keys to communicate direction information and command selections to processor 510 and to control cursor movement on display 550. Electronic system 500 further includes network interface 580 to provide access to a network, such as a local area network. Network interface 580 may further include one or more antennae 585 to provide a wireless network interface according to any protocol known in the art.

Instructions are provided to memory from a storage device, such as magnetic disk, a read-only memory (ROM) integrated circuit CD-ROM, DVD, via a remote connection (e.g., over a network via network interface 580) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   sending a request for a first network operation from a first network stack layer to a second network stack layer using a token-based asynchronous inter-layer communication protocol in an operating system independent environment;
   performing, with the first network stack layer, a second network operation prior receiving an indication of completion of the first network operation; and
   sending the indication of completion of the first network operation from the second network stack layer to the first network stack layer via an embedded firmware agent in response to completion of the first network operation.

2. The method of claim 1 wherein the first network stack operation comprises a data transmission operation.

3. The method of claim 1 wherein the first network stack operation comprises receipt of data via a network connection.

4. The method of claim 1 wherein the operating system independent environment comprises a pre-boot execution environment.

5. The method of claim 1 wherein the first network stack layer and the second network stack layer are both communicatively coupled with an embedded firmware agent in a host system that supports the asynchronous token-based network stack.

6. The method of claim 1 wherein the indication of completion includes at least the token.

7. An apparatus comprising:
   an embedded firmware agent capable of functioning in an operating system independent manner;
   control circuitry to support a token-based asynchronous inter-layer communication protocol communicatively coupled with the embedded firmware agent to send a request for a first network operation from an upper network stack layer to a lower network stack layer using a request including a token, performing, with the upper network stack layer, a second network operation prior receiving an indication of completion of the first network operation, and send the indication of completion of the first network operation from the second network stack layer to the first network stack layer via an embedded firmware agent in response to completion of the first network operation.

8. The apparatus of claim 7 wherein the first network stack operation comprises a data transmission operation.

9. The apparatus of claim 7 wherein the first network stack operation comprises receipt of data via a network connection.

10. The apparatus of claim 7 wherein the operating system independent environment comprises a pre-boot execution environment.

11. The apparatus of claim 7 wherein the indication of completion includes at least the token.

12. An article comprising a computer-readable medium having stored thereon instructions that, when executed, cause one or more processing components to:
    send a request for a first network operation from a first network stack layer to a second network stack layer using a token-based asynchronous inter-layer communication protocol in an operating system independent environment;
    perform, with the first network stack layer, a second network operation prior receiving an indication of completion of the first network operation; and
    send the indication of completion of the first network operation from the second network stack layer to the first network stack layer via an embedded firmware agent in response to completion of the first network operation.

13. The article of claim 12 wherein the first network stack operation comprises a data transmission operation.

14. The article of claim 12 wherein the first network stack operation comprises receipt of data via a network connection.

15. The article of claim 12 wherein the operating system independent environment comprises a pre-boot execution environment.

16. The article of claim 12 wherein the indication of completion includes at least the token.

17. A system comprising:
   one or more processing components;
   a network interface coupled with the one or more processing components; and
   a computer-readable medium coupled with the one or more processing components having stored thereon instructions that when executed, cause the one or more processing components to send a request for a first network operation from a first network stack layer to a second network stack layer using a token-based asynchronous inter-layer communication protocol in an operating system independent environment, perform, with the first network stack layer, a second network operation prior receiving an indication of completion of the first network operation, and send the indication of completion of the first network operation from the second network stack layer to the first network stack layer via an embedded firmware agent in response to completion of the first network operation.

18. The system of claim 17 wherein the first network stack operation comprises a data transmission operation.

19. The system of claim 17 wherein the first network stack operation comprises receipt of data via a network connection.

20. The system of claim 17 wherein the operating system independent environment comprises a pre-boot execution environment.

* * * * *